March 3, 1953
J. A. DIETHELM
2,629,979
BEET TOPPER
Filed Dec. 5, 1947
3 Sheets-Sheet 1
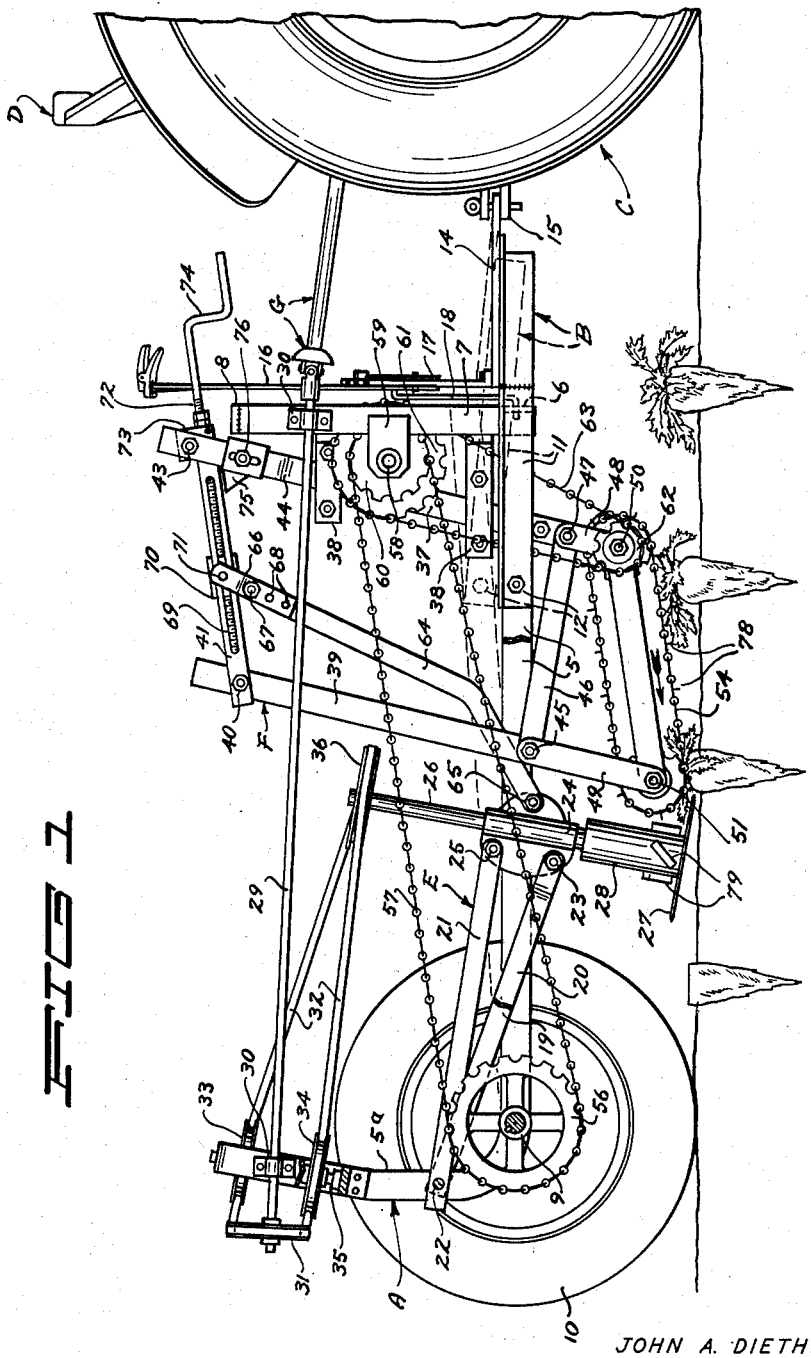
Inventor
JOHN A. DIETHELM
By Carlsen + Hagle
Attorney

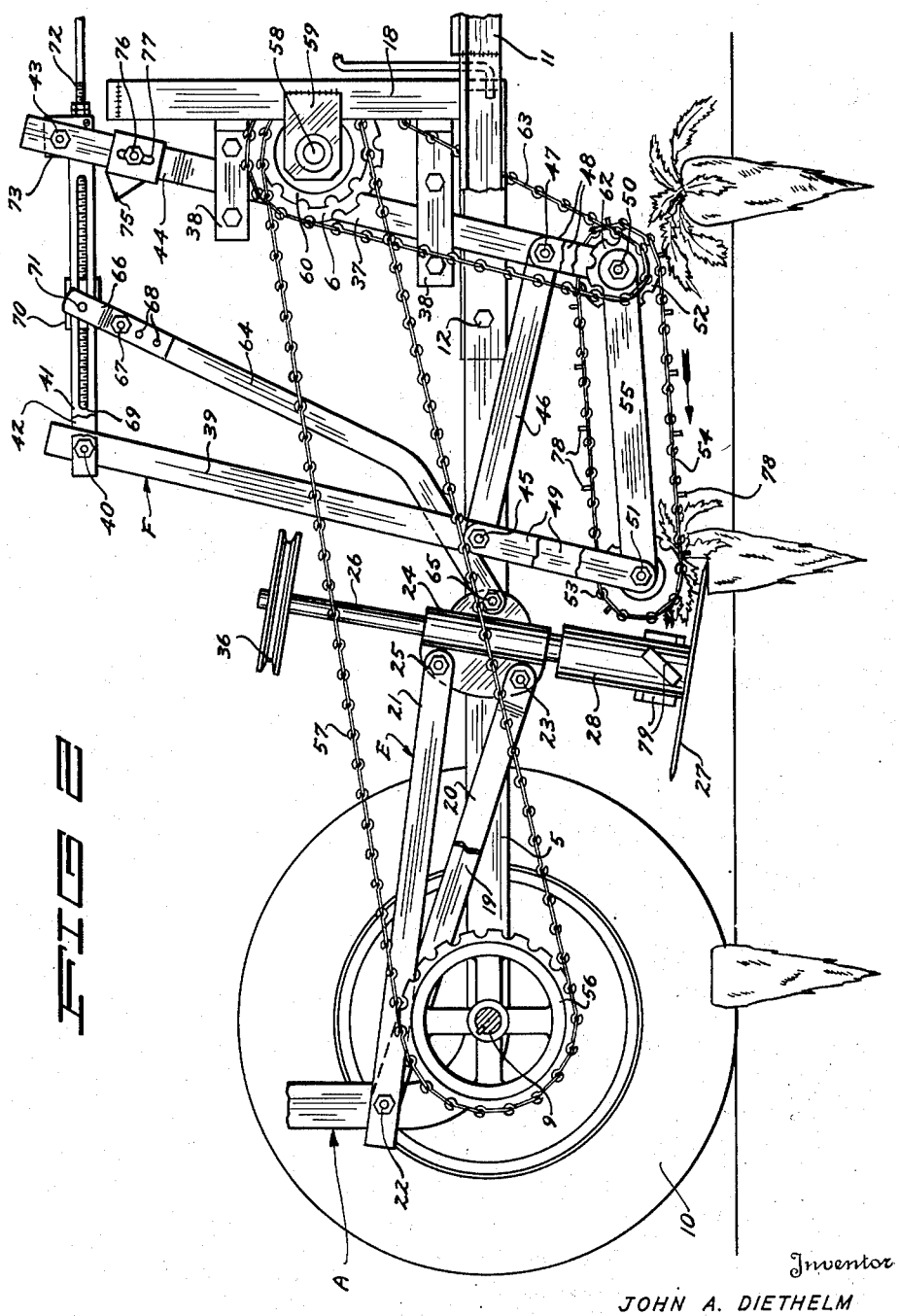

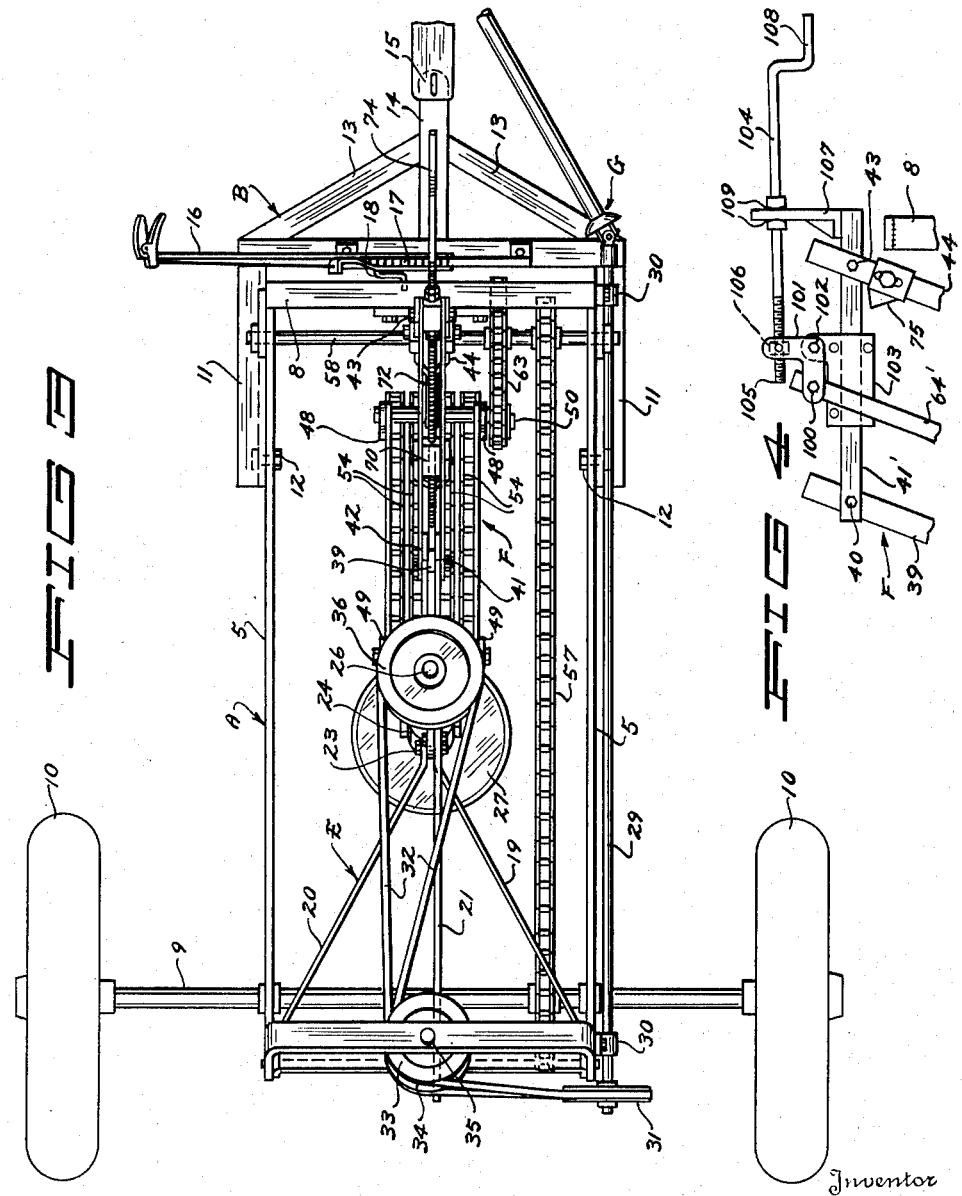

Patented Mar. 3, 1953

2,629,979

UNITED STATES PATENT OFFICE 2,629,979

BEET TOPPER

John A. Diethelm, Victoria, Minn.

Application December 5, 1947, Serial No. 789,943

8 Claims. (Cl. 56—121.46)

This invention relates to improvements in sugar beet harvesting equipment and more particularly to an implement for cutting off the tops of the beets preliminary to the pulling and loading of the beets themselves.

The primary object of my invention is to provide a machine which will accurately cut off the tops of the beets, regardless of their size and height above ground, in said manner that just enough of the top or cap of each beet will be severed so that all green stuff will be removed, and will accomplish this work rapidly and efficiently. As is well known to those associated with the production of sugar beets, these beets vary considerably in their height above ground, and usually when there are beets in the row which project well above the soil it is these that have the heaviest foliage. Previous topping machines to my knowledge, while accommodating themselves to beets of different heights, remove about the same amount of the tops or caps of the beets themselves, and thus are found to leave a little green stuff or leaves on the larger, or higher beets. This green stuff causes spoilage in the cars or stock piles at the sugar factory. My machine, by a novel cooperation of its elements automatically adjusts itself to cut deeper into a high, heavily foliaged beet than it does into the lower less heavily leaved beets, and as a result is found to completely remove the tops in all cases, with a minimum of cut or loss from the beets themselves.

A further object of my invention is to provide a machine having a cutter or cutting disk arranged to slice off the tops of the beets, and forwardly of said disk, an endless chain finder device which on its lower, forwardly inclined side or flight rides over the beets. Said finder has prongs which hold the beets in place as they are topped by the disk, and the finder further is supported for up and down movements, as is the disk, so that these elements automatically accommodate themselves to beets of different heights along the row. Further, as an important feature and object of my invention, the up and down movements of the finder and cutter disk are proportionately related so that as the finder rises to ride over a high beet the disk will also rise but to a lesser degree so as to take a deeper bite into the high, large and heavily foliaged beet, to thereby remove all of the top stuff therefrom. Said finder further as an object of my invention is arranged to run at its lower, beet engaging flight or span in a rearward direction at a speed so proportioned to the ground or forward travel speed of the implement along the row as to hold the beets firmly as they are topped, or to actually thrust the beet slightly rearwardly toward the cutter. This overcomes the tendency of previous finders, which merely drag across the tops of the beets, to push the beets over so that they are sliced off at an angle, or even only partially topped.

A large high beet sometimes occurs next in the row to a small, low beet and the usual topper after riding over the high beet has a tendency to miss the next one, by failing to drop fast enough to counteract the travel movement of the implement. In accordance with my invention, as an important object thereof, the finder and cutter elements are so supported that as the cutter drops off a high beet it also swings in a rearward direction which to a large extent cancels out the forward travel motion causing the cutter to drop almost straight down, in time and in position to top the next beet even if it is a very small and low one.

Still another object is to provide a machine having the foregoing very desirable characteristics, which is also simple and comparatively inexpensive in construction, is arranged for convenient adjustment from the tractor which pulls it, and which has further detailed advantages as will be set out hereinafter.

These and other more detailed and specific objects will be disclosed in the course of the following specification, reference being had to the accompanying drawings, in which—

Fig. 1 is a side elevation of a beet topping implement according to my invention, certain parts being broken away and shown in section, and showing the cutter in the process of topping a small and comparatively low beet.

Fig. 2 is a fragmentary view similar to Fig. 1, on a slightly enlarged scale, showing a high beet being topped.

Fig. 3 is a plan view of the machine.

Fig. 4 is a fragmentary detail view of a modified adjustment mechanism.

A one row version of the machine is herein shown and described but it will be apparent that the parts may be duplicated as necessary for topping two, three or more rows simultaneously. Also, while I do not here show it for the reason that it is no part of the present invention, the machine may carry a harvesting conveyor for picking up the tops as they are cut from the beets, for use as a stock feed.

Referring now more particularly and by reference characters to the drawing, A designates generally the main frame of my machine, having side bars 5 joined at their forward ends by a cross bar 6 from which forward frame members 7 extend upwardly, these being joined by a top cross bar 8. A live axle 9 is journaled through the rear ends of the side bars 5 and mounted in the ends of the axle are ground wheels 10.

A tractor hitch frame B is provided having side bars 11 pivoted at rear ends at 12 to the side bars 5 some distance from their forward ends, and the side bars 11 are joined by forwardly converging braces 13 supporting a draft bar 14 which is adapted to be coupled at 15 to the usual draw bar of a tractor C. A hand lever 16 is pivoted on the usual quadrant 17 on the hitch frame B and is connected by a link 18 to the forward end of the main frame A in such manner that the lever may be used to raise and lower the forward end of frame A as indicated in dotted line in Fig. 1. It will be noted that the hand lever 16 is in a position for convenient operation by the operator from his seat D on the tractor.

The frame A supports two separate upwardly and downwardly swinging frame structures, one of which will be called the cutter frame and is designated generally at E, and the other, the finder frame designated at F. The cutter frame E comprises a pair of forwardly converging lower link bars or arms 19—20 and a single centrally located upper arm 21. These arms all are pivoted upon a cross rod 22 from which they extend forwardly over the axle 9, the cross rod being mounted between upwardly turned rear ends 5ª of the side bars 5. The forward ends of the lower arms 19—20 are pivoted at 23 to a bearing 24, while the upper arm 21 is similarly pivoted to the bearing at an upper point 25. The bearing 24 forms an elongated journal support for a cutter shaft 26 on the lower end of which, well below the bearing, is a cutter 27 having a large hub 28. The cutter 27 takes the form of a peripherally sharpened circular disk and it will be noted that the arms so support the bearing 24 that this disk tilts forwardly somewhat from a true horizontal position.

The cutter 27 is power rotated from the tractor power take-off (not shown) by a drive shaft 29 which is journaled through bearings 30 on the frame member 7 and side bar end 5ª at one side of the machine, a conventional universal joint and sleeve G connecting this shaft at its forward end to the power take-off shaft. At its rear end the drive shaft 29 carries a belt pulley 31 over which runs a belt 32. This belt is trained over idler pulleys 33—34 upon a generally upright shaft 35 and then runs forwardly over a pulley 36 secured to the upper end of the cutter shaft 26 to complete the drive. Obviously, the belt will drive the cutter even as it is swung upwardly and downwardly with its swingable frame E but if necessary a belt tightener may be used. The rear end of the machine is, of course, suitably framed to support the idler pulley shaft 35.

The finder frame F comprises a generally upright front frame structure 37 which is clamped in clamps 38 secured to the upright forward portion of the main frame A. The frame structure 37 actually tilts downwardly and rearwardly and may be raised and lowered on the clamps and secured where desired. The frame further includes a rear frame bar 39 parallel with the frame structure 37 and at its upper end this bar is pivoted at 40 between upper tie bars 41—42 which pass between and are pivoted at 43 to a bifurcated upper portion 44 of the front frame structure. The lower end of the rear frame bar 39 is pivotally attached to a cross rod 45 whereon is also pivoted a lower tie bar 46. The bar 46 extends forwardly and is pivoted at a cross rod 47 carried at the lower end of the frame structure 37. Thus, there is formed a rectilinear four sided frame structure, and depending from opposite ends of the cross rods 45, 47 are pairs of front and rear links 48—49 between which extend sprocket shafts 50—51 carrying a plurality of sprockets 52—53. Four, more or less, implement-type chains 54 are trained around the sprockets 52—53 and the shafts 50—51 are held apart, and the chains held taut by side plates 55 through which the shafts pass. The endless conveyor or chain structure thus formed constitutes the finder itself, and the arrangement is such that it inclines downwardly and rearwardly toward and operates centrally ahead of the cutter 27. Obviously, the tie bars 41, 46 so support the structure that the rear end of the finder has an upwardly and downwardly floating action. The links 48 are locked on the rod 47 so that the chain assembly is held against rearward swinging displacement.

The chains 54 are operated, to travel rearwardly at their lower flights or spans (note arrows in Figs. 1–2) by the travel movement of the machine and for this purpose a sprocket 56 is mounted upon the live axle 9, over which sprocket runs a drive chain 57. A countershaft 58 is journaled in bearing brackets 59 upon the main frame front members 7 and another sprocket 60, engaged with chains 57 is placed on this shaft. Aligned sprockets 61 and 62 are then mounted on the countershaft 58 and forward sprocket shaft 50 and connected by a sprocket chain 63, to thus run the finder chains 54.

The two frames E and F are connected by an angularly shaped actuating member or connecting link 64 which is pivoted at its lower end 65 to the fine part of the cutter bearing 24 and angles upwardly and then forwardly past the rear frame bar 39 to the upper tie bars 41—42. The upper end of the link 64 has a bifurcated attachment 66 which upwardly straddles the tie bars 41—42 and this attachment is fastened by a bolt 67 to the link, with a series of openings 68 to permit overall length adjustment of the link. The bars 41—42 have longitudinal slots 69 and a block 70 between the bars has laterally projecting pins 71 to which the upper forked ends of the attachment 66 are pivoted. The block 70 is topped to engage a hand screw 72 mounted rearwardly through a block 73 at the forward ends of the tie bars. The forward end of the hand screw 72 has a crank 74 which may be readily reached from the tractor seat D, and the screw is, of course, prevented from axial displacement through the block 73 so that by turning the crank the block 70 and attached upper end of link 64 may be moved forwardly or rearwardly as desired.

An adjustable stop 75 is mounted by a bolt 76 on the forward frame structure 37 so that it will upwardly engage the tie bars 41—42 and so limit down movement of both frames E and F. The stop device 75 has a slot 77 for the bolt 76 so that it may be adjusted to cause the cutter 27 to just clear or run at the surface of the ground, as will be evident.

In setting up the machine for use in the row the frame A is lowered from its transport position, at which the cutter and finder are raised in the clear, so that the cutter comes to rest on or very near the ground, depending upon the adjustment of the stop 75. The frame F is properly adjusted through the clamps 38 so that the rear lower part of the finder stands just above the cutter and forwardly of its hub 28.

The chains 54 have projecting prongs or teeth 78 to engage the beet tops and now as the machine is set in motion the chains are run rearwardly as previously described. Now, as the chains (or finder) reach a beet they will engage its top as the cutter 27 moves into engagement with the beet. The cutter is, of course, rotating and it will slice off the beet top while the beet is held firmly by the finder resulting in a neat and accurate topping cut. The amount of the top or cap of the beet itself severed is obviously determined by the space between the rear end of the finder and the forward part of the cutter and this distance, and the cut, may be varied by turning the crank 74. Thus, as the crank is turned to pull the upper end of the link 64 forward the cut will be decreased since the cutter is raised relative to the finder, and vice versa.

The finder chains 54 run at a speed so proportioned to the rate of forward travel of the machine that they will hold the beets firmly as they are topped, but without grinding or chewing up the tops. In fact, the running speed of the chains may be slightly greater than the travel speed of the machine so that the finder will slightly push the beets rearwardly into the cutter. It will be readily understood that the finder in either case will have absolutely no tendency to push the beets over forwardly as so many other machines do. It will further be readily appreciated that the selected ratio between finder running speed and machine travel speed will be retained regardless of the variation in the latter since the finder is driven from the machine axle.

As the tops are severed they are cast out to one side by fins 79 on the cutter hub and the tops are deposited between the rows ready for harvesting for use as feed, or any other purposes.

When the machine encounters a beet which is large and stands high above the ground such as seen to the right in Fig. 1, as being cut in Fig. 2, the finder chains ride up over the top of the beet, swinging the rear part of the frame F upwardly. The upward movement of frame F is transmitted to the cutter 27 through the link 64 thus also raising the cutter. However, and here lies an important feature of my invention, the cutter does not rise as far as the finder for the reason that the leverage acting upon link 64 (from points 43 to 71) is less than the length of the connecting bars 41—42. Thus, while the cutter also rises, it lags behind and as a result (see Fig. 2) takes a deeper bite into the beet to remove a little more of the top thereof. As previously explained, these high, usually larger beets, have more bushy and profuse tops and this deeper cut is necessary so that all foliage is removed. Obviously this arrangement permits the cut to vary automatically as conditions require, and eliminate the necessity either of setting the cut to suit the larger beets, with a resulting waste of the smaller beets, or leaves a part of the top in place to later cause spoilage. The finder of my invention is of particular advantage in topping these high beets since it holds them firmly and has no tendency to topple them over and slice them off at a bevel, as occurs in some other machines.

The differential between the upward movement of the finder and that of the cutter may be regulated by turning the crank 74 to vary the leverage operating as the link 64 as will be understood. In practice, the operator after sizing up the row will make this adjustment according to the number of large and high beets and will select the minimum normal cut to secure proper topping and minimum waste.

It will be noted that as the cutter moves down after topping the higher beet it will also swing rearwardly due to the rear pivot for the arms 19, 20 and 21. Thus, as the cutter drops off the high beet it will also swing back and this rearward movement in part at least compensates for the forward travel of the machine. Thus, the cutter drops almost, if not entirely, straight down in position to top the next beet (if it is small) without any tendency to slip or imperfectly top the same. This too, is a failing of some other machines of my knowledge, which my improved topper overcomes. The importance of this feature is not too minimized since it is true that the beet next to a large high one is usually a small low beet, as is well known to those skilled in this field.

A modification of the adjustment for the cutter frame structure is shown in Fig. 4. In this case the upper end of the link 64', instead of being slidably connected to the upper tie bars 41'—42', is pivoted at 100 to a bell crank lever 101 fulcrumed at 102 upon a clamp 103. Said clamp 103 is adapted to be adjusted along the tie bar 41' (the extra bar 42' may here be omitted), and clamped in any set position. A hand screw 104 has its threaded end 105 engaged with a nut 106 on the upper end of the lever 101, and the screw extends forwardly through a bracket 107 and terminates in a hand crank 108. Stops 109 on the screw prevent its lengthwise displacement through the bracket, and it will be apparent that by turning the crank 108 the bell crank lever 101 may be oscillated to raise or lower the link 64' and the cutter attached thereto. The "bite" of the cutter may thus be adjusted as required, while the differential in the cutter-finder movements previously described may be set by adjusting the clamp 103 along the tie bar 41'.

It may be noted that in the low position (Fig. 1) the cutter 27 stands at its forward edge further back with respect to the finder, than it does when the parts are raised as they travel over and top a high beet. See Fig. 2. In other words, as the cutter moves up it also swings forward further beneath the finder and is thus in position to top the high beet, which needs support against the thrust of the cutter, while this beet is firmly held by the finder.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a beet topping machine of the character described, a wheel borne frame adapted to travel along the beet row, a cutter pivotally supported on the frame for up and down swinging movements with respect thereto, means operative to lift the cutter as it tops a high beet and to lower it as it tops a lower beet, and the pivot for said support being located on the frame upwardly and rearwardly of the cutter whereby the cutter will swing in an arcuate and rearward direction as it moves downwardly off a high beet.

2. In a beet topping machine of the character described, a main frame adapted to travel along the beet row, separate cutter and finder frame structures connected to the main frame for up and down movements with respect thereto, a cutter on the frame structure for topping the beets, a finder on the finder frame structure operative to ride up on and over the beet tops in advance of the cutter and hold the beets as they are topped, the finder frame including a connecting bar arranged in a forwardly and rearwardly extending direction, and a link connected at its lower end to the cutter frame and at its upper end to the said connecting bar between its ends, and means for adjusting the connection point of the upper end of the link forwardly and rearwardly along the connecting bar.

3. In a beet topping machine of the character described, a main frame adapted to travel along the beet row, separate cutter and finder frame structures connected to the main frame for up and down movements with respect thereto, a cutter on the cutter frame structure for topping the beets, a finder on the finder frame structure operative to ride up on and over the beet tops in advance of the cutter and hold the beets as they are topped, the finder frame including an upper forwardly and rearwardly extending connecting bar pivotally supported at this forward end for up and down swinging movements as the finder rides up and down over the beets, and a link pivotally connected at its upper and lower ends to the cutter frame and the connecting bar respectively.

4. In a beet topping machine of the character described, a main frame adapted to travel along the beet row, separate cutter and finder frame structures connected to the main frame for up and down movements with respect thereto, a cutter on the cutter frame structure for topping the beets, a finder on the finder frame structure operative to ride up on and over the beet tops in advance of the cutter and hold the beets as they are topped, the finder frame including an upper forwardly and rearwardly extending connecting bar pivotally supported at its forward end for up and down swinging movements as the finder rides up and down over the beets, a link pivotally connected at its upper and lower ends to the cutter frame and the connecting bar respectively, and means for adjusting the link up and down with respect to the connecting bar.

5. In a beet topping machine of the character described, a main frame adapted to travel along the beet row, separate cutter and finder frame structures connected to the main frame for up and down movements with respect thereto, a cutter on the cutter frame structure for topping the beets, a finder on the finder frame structure operative to ride up on and over the beet tops in advance of the cutter and hold the beets as they are topped, the finder frame including an upper forwardly and rearwardly extending connecting bar pivotally supported at its forward end for up and down swinging movements as the finder rides up and down over the beets, a link pivotally connected at its upper and lower ends to the cutter frame and the connecting bar respectively, and means for adjusting the connection of the upper end of the link forwardly and rearwardly on said connecting bar.

6. In a beet topping machine of the character described, a main frame adapted to travel along the beet row, separate cutter and finder frame structures connected to the main frame for up and down movements with respect thereto, a cutter on the cutter frame structure for topping the beets, a finder on the finder frame structure operative to ride up on and over the beet tops in advance of the cutter and hold the beets as they are topped, the finder frame including an upper forwardly and rearwardly extending connecting bar pivotally supported at its forward end for up and down swinging movements as the finder rides up and down over the beets, a link pivotally connected at its upper and lower ends to the cutter frame and the connecting bar respectively, means for adjusting the connection of the upper end of the link forwardly and rearwardly on said connecting bar, and also upwardly and downwardly with respect to that bar.

7. In a beet topping machine of the character described, a main frame adapted to travel along the beet row, separate cutter and finder frame structures connected to the main frame for up and down movements with respect thereto, a cutter on the cutter frame structure for topping the beets, a finder on the finder frame structure operative to ride up on and over the beet tops in advance of the cutter and hold the beets as they are topped, a link connecting the cutter frame structure to a part of the finder frame structure to raise and lower the cutter as the finder travels over the beets, said finder frame having an upright part, and clamp means on the main frame adjustably supporting said upright part for bodily adjusting the finder frame up and down with respect to the main frame.

8. In a beet topping machine of the character described, a main frame adapted to travel along the beet row, separate cutter and finder frame structures connected to the main frame for up and down movements with respect thereto, a cutter on the frame structure for topping the beets, a finder on the finder frame structure operative to ride up on and over the beet tops in advance of the cutter and hold the beets as they are topped, and the finder frame including relatively forwardly and rearwardly spaced generally upright members and an upwardly located connecting member extending forwardly and rearwardly, and a link connected at its lower end to the cutter frame and adjustably connected at its upper end to the said connecting member of the finder frame.

JOHN A. DIETHELM.

REFERENCES CITED

The following references are of record in the file of this patent:

UNITED STATES PATENTS

| Number | Name | Date |
| --- | --- | --- |
| 856,394 | Conner | June 11, 1907 |
| 1,351,287 | Devey | Aug. 31, 1920 |
| 1,462,486 | Devey | July 24, 1923 |
| 1,635,494 | Moreau | July 12, 1927 |
| 1,651,030 | Kowalsky | Nov. 29, 1927 |
| 1,675,903 | Murphy | July 3, 1928 |
| 1,752,285 | Andersen | Apr. 1, 1930 |
| 1,951,444 | Sands | Mar. 20, 1934 |
| 2,141,806 | Zielesch | Dec. 27, 1938 |
| 2,337,307 | Beck | Dec. 21, 1943 |
| 2,340,919 | Allen | Feb. 8, 1944 |
| 2,369,850 | Powers | Feb. 20, 1945 |
| 2,430,665 | Briggs | Nov. 11, 1947 |
| 2,478,877 | Smith | Aug. 9, 1949 |
| 2,539,881 | Wilkins | Jan. 30, 1951 |